June 14, 1966     C. J. HEFFELFINGER     3,256,379
PROCESS FOR STRETCHING POLYESTER FILMS
Filed Nov. 21, 1961
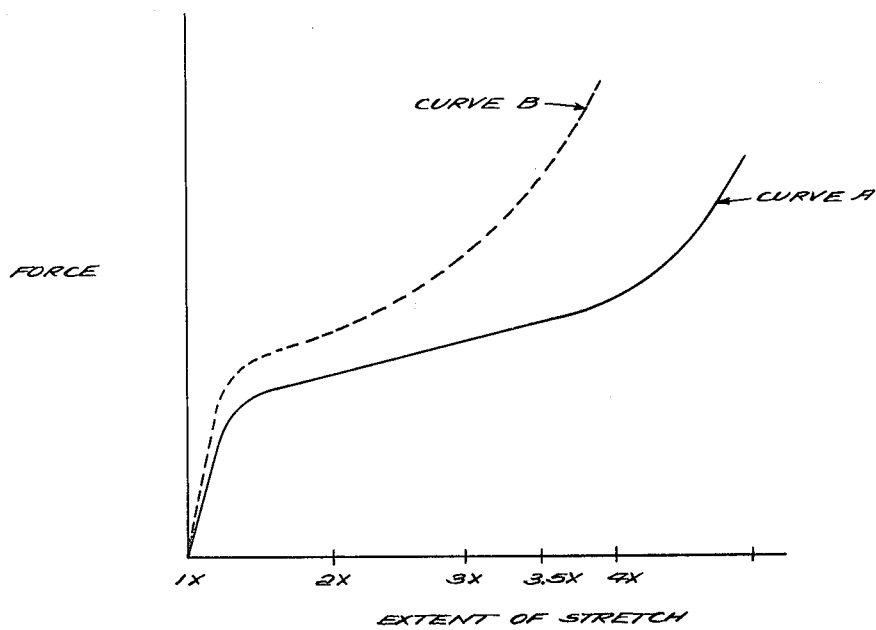
INVENTOR
CARL JOHN HEFFELFINGER,
BY Robert J Black
AGENT

United States Patent Office 3,256,379
Patented June 14, 1966

3,256,379
PROCESS FOR STRETCHING POLYESTER FILMS
Carl John Heffelfinger, Circleville, Ohio, assignor to E. I. du Pont de Nemours and Company, Wilmington, Del., a corporation of Delaware
Filed Nov. 21, 1961, Ser. No. 153,795
5 Claims. (Cl. 264—289)

This invention relates to a process of stretching polyester films, and more particularly to an improved process for stretching polyethylene terephthalate film to enhance uni-directional physical properties.

Stretching films of substantially amorphous polyethylene terephthalate and the like to orient them and, thus, to improve their physical properties, is well known. The prior art has invariably defined stretching conditions primarily in terms of stretch ratio. It is generally recognized in the art that directional properties such as the physical properties are highest in the direction of greatest stretch in a film made using unbalanced stretch ratios. For example, in order to manufacture a base film useful for such proposes as magnetic recording tapes, video tapes, etc., which must possess unusually high unidirectional tensile properties, it is necessary to utilize processes which require rather drastic stretching conditons such as unusualy high extents of stretch in one direction and critical temperature sequences. Carrying out these methods often requires expensive specialized equipment and extreme care in conducting each process step.

In the production of general purpose film for such uses as packaging, which normally requires a film which has similar physical properties in all directions, dependence on a particular set of stretch ratios has not always produced uniformly desired results. Quite often it is necessary to continuously alter the longitudinal direction to transverse direction stretch ratio in order to obtain a uniform product. Fluctuation of such variables as directional physical properties, gauge variation, high temperature durability, and certain electrical properties would seem to indicate that adjustment of stretch ratio in each direction is but one factor contributing to the structure of oriented polyethylene terephthalate films.

In addition to the basic chemical composition, the physical, electrical and optical properties of polyethylene terephthalate films are dependent upon the structure produced during stretching and heat setting. This structure consists of a complex network of molecular chains passing through crystalline and amorphous regions in a variety of directions. The physical work used to deform the random system of molecular chains of cast amorphous film produces the combinations of properties associated with polyethylene terephthalate films by chain orientation and crystallization. Film properties are dependent upon the degree of interaction of the orientation and size of crystalline and amorphous regions. The early art recognized the fact that by stretching substantially amorphous polyethylene terephthalate films in one or both directions at temperatures above the apparent second order transition temperature, that the film crystallized rapidly and that the crystallites thus formed were aligned, i.e., oriented. It was later discovered that by manipulation of the amount the film was stretched in both directions, that a family of films possessing various levels of physical properties could be prepared. Thus, for example, it was found that a film possessing unusually high uni-directional tensile strength could be prepared by stretching the film in both directions to an equivalent extent, heat treating, and then stretching further in a direction in which these enhanced physical properties were desired.

Through the medium of X-ray diffraction studies and stress-strain determinations, it has been discovered that the extent to which the film is stretched in one or both directions, i.e., stretch raito, is not the sole factor in determining the level of physical properties.

It is an object of this invention to provide a process for stretching polyester films.

It is a further object of this invention to provide an improved process for stretching polyethylene terephthalate film to enhance uni-directional physical properties.

A still further object is to provide an improved continuous process for stretching polyethylene terephthalate film at extremely high stretching rates to enhance uni-directional physical properties. These and other objects appear hereinafter.

These and other objects are accomplished according to the process of the present invention by extruding molten polyethylene terephthalate to form an amorphous film, stretching the film at a temperature at which molecular orientation is effected in the direction perpendicular to extrusion to an extent of at least 2.5 times its initial width at a rate of speed of at least 1000 percent per minute, and thereafter stretching the film at a temperature at which molecular orientation is effected in the direction in which the film is extruded to an extent of at least 2.5 times its initial length at a rate of speed of at least 60,000 percent per minute.

The invention will be described with regard to polyethylene terephthalate film, such as that formed by the process disclosed in U.S. Patent 2,465,319.. The polyethylene terephthalate can be prepared by the condensation of ethylene glycol and terephthalic acid or by carrying out an ester interchange reaction between ethylene glycol and a dialkyl ester of terephthalic acid, e.g., dimethyl terephthalate. The present invention is applicable to films prepared from polyethylene terephthalate homopolymer, and also from copolyesters of ethylene terephthalate. These coplymers are synthetic linear glycol-dicarboxylate polyesters wherein at least 75 mol percent of the recurring structural units are ethylene terephthalate structural units. Thus, the terephthalate radicals can be the sole dicarboxylic constituent of the recurring structural units, or up to 25% of the recurring structural units can contain other dicarboxylic radicals, such as adipate, sebacate, isophthalate, 5-(sodium sulfo)-isophthalate, bibenzoate, hexahydroterephthalate, diphenoxy-ethane-4,4'-dicarboxylate or p,p'-sulfonyl dibenzoate radicals, derived from the corresponding carboxylic acids or ester-forming derivatives thereof. Similarly, ethylene glycol can be the sole glycol constituent of the polyester, or the polyester can contain up to 25% of another glycol constituent, such as tetramethylene glycol, hexamethylene glycol, decamethylene glycol, trans-p-hexahydro-xylylene glycol, diethylene glycol, bis-p-(beta-hydroxyethoxy)benzene, bis - 1,4-(beta-hydroxyethoxy)-2,5 - dichlorobenzene, or bis-[p-(beta-hydroxyethoxy)-phenyl]difluoromethane. Also applicable to the present invention are other linear terephthalate polyesters such as the linear polyester prepared from terephthalic acid and 1,4-cyclohexanedimethanol.

The molten polyethylene terephthalate must be cast under conditions such that the formed film, when solid, is substantially amorphous. This is conveniently accomplished by extruding the melt at a temperature of 270–315° C. onto a casting drum maintained at a temperature sufficiently low, e.g. 60–80° C. to effect rapid quenching or chilling of the polymer from the molten state such as is conventional in the art.

The temperatures employed in stretching the film are those temperatures normally employed for the molecular orientation of polyethylene terephthalate film, i.e., about 80–90° C. for the transverse direction stretch and about 90–160° C. for the longitudinal direction stretch. Generally, temperatures above the second order transition temperature but below the crystalline melting range can be employed.

The film must be stretched first in the transverse direction at a rate of speed sufficiently high to develop molecular orientation of the chain segments and crystallites formed such that maximum enhancement of the physical property level of the film can be developed during the longitudinal direction stretch. A minimum stretch rate of at least 500 percent per minute is desirable. Maximum rate of stretching will be determined by the nature of the equipment employed for transverse stretching. Tentering devices normally employed for such use place a limitation on the maximum speed which may be employed for the transverse direction stretching step. Preferred range of transverse direction stretch rate will be greater than 1,000 percent per minute and most preferably above 1,500 percent per minute. The extent of stretch is at least 2.5 times its initial width preferably, 2.5 to 5 times its initial width and most preferably 3.5 to 4 times its width.

After being stretched transversely, the film is stretched in the longitudinal direction to an extent of at least 2.5 times its initial length at a rate of speed of at least 60,000 percent per minute. The preferred rate of stretching in the longitudinal direction will range between 80,000–100,000 percent per minute while the extent of stretch is 2.5–5 times the initial length of the film. Most preferably, the extent of stretch will be greater than 3 times the initial length.

After the film is stretched in both the transverse and longitudinal directions, it can be heat-set while held under tension at a temperature within the range of 135–250° C.

In order to exceed the most probable relaxation time of the oriented structure at the temperatures employed for stretching, rates of stretch far in excess of those heretofore employed in the orientation of polyethylene terephthalate film must be utilized. It is thought that this rate must be at least 60,000 percent per minute. As will be seen in the examples to follow, when a polyethylene terephthalate film is stretched in the longitudinal direction at rates in excess of 60,000 percent per minute, an oriented polyethylene terephthalate film is obtained possessing a high level of uni-planar orientation and enhanced physical property levels in both directions.

It is recognized from studies of stress-strain curve relationships of polyethylene terephalate films which have been stretched first in the direction perpendicular to that of extrusion, that in order to obtain polyethylene terephthalate films with high level physical properties the film must be elongated past its elastic limits (point of permanent deformation) and the point of inflection (point of reinforcement) into the region of reinforcement. When the region of reinforcement is reached, a substantial increase in force is necessary to cause the film to elongate further.

At the rates of stretching normally employed to stretch a transverse direction stretched polyethylene terephthalate film past the point of reinforcement and into the reinforcing region, it is required that the film be stretched to a considerable extent, i.e., the longitudinal direction stretch ratio must be high. As mentioned hereinbefore, the use of high stretch ratios has a considerable number of disadvantages, such as the requirement for specialized equipment, extreme criticality of carrying out the process steps, etc.

It is also recognized from X-ray diffraction techniques that films having a high degree of uniplanarity in the crystallite regions have a high physical property level in all directions in a given plane. Uni-planar orientation is defined as a type of orientation wherein a crystalline plane is oriented parallel to a reference plane. The degree of uni-planarity of the crystallite structure is determined by X-ray diffraction techniques wherein the angular relationship between a given crystallite plane and the number of such planes is parallel to the film surface. An angle ($\sigma\hat{u}$) of 0° would indicate that one of the crystallite planes of the oriented film structure is completely aligned in a parallel relationship with the surface of the film, signifying a high degree of uni-planar orientation. An angle of 45° would indicate a random relationship between the film surface and the given crystallite plane, therefore signifying little or no uni-planarity.

The present invention comprises elongating polyethylene terephthalate film which has first been stretched transversely in the longitudinal direction at a rate of speed sufficiently high so as to cause the film to elongate almost immediately into the reinforcing portion of its stress-strain curve. By exceeding the most probable relaxation time of the polymeric film, i.e., reducing the flat portion of the stress-strain curve representing the natural draw ratio,[1] the need for excessively high stretch ratios is avoided, and a film with a high degree of uni-planar orientation is obtained. This phenomenon is illustrated in FIGURE 1.

In FIGURE 1, curve A represents a typical stress-strain relationship of a transverse direction stretched (at least 2.5 times) polyethylene terephthalate film which is stretched at conventional stretch rates and temperatures in the longitudinal direction. As can be seen from FIGURE 1, wherein the force required to stretch the film is plotted against the extent of stretch, the stress-strain curve of the film rises sharply as the film is stretched, until a point is reached at a stretch ratio of about 1.5× where the curve rises slowly. This relatively level portion of the curve represents the region of the natural draw ratio, i.e., where only little additional force is required to further stretch the film. At a point beyond 3.5× the force level required to further stretch the film rises sharply as seen by the vertical ascent of the stress-strain curve. This region on the curve is called the region of reinforcement. As described hereinbefore, the film must be stretched into this reinforcement region in order to obtain good physical property levels. At conventional rates of stretch, the stress imparted is not sufficient to force the film into the region of reinforcement until the film has undergone considerable elongation (more than 3.5× in the example given in FIGURE 1). Until this advanced stage of elongation is reached, the network of polymer chains are not fully extended and the structure is somewhat relaxed. It is believed that at these lower rates of stretch, that the structural units are given time to adjust themselves to the stresses applied.

As can be seen from curve B, representing a typical stress-strain relationship of a transverse direction stretched polyethylene terephthalate film (identical to that illustrated in Curve A) which is stretched at conventional temperature but at stretching rates in the longitudinal direction in excess of 60,000 percent per minute, the stress-strain curve rises sharply until an elongation of about 1.5× is reached. At this point, however, the curve does not continue to level off, but ascends substantially vertically indicating that the reinforcing region of the curve has been reached. It is evident from a comparison of the two curves that at stretch rates over 60,000 percent per minute, the reinforcing region of the stress-strain curves of transverse direction oriented polyethylene terephthalate films is reached at a much lower stretch ratio than at conventional rates of stretching. By utilizing the higher rates of stretch, stress is applied at such a rapid rate that the structural network of chains does not have time to assume positions to minimize the applied stress and as a consequence, because of the sudden vastly increased amount of stress (work) applied to the film in a shortened time interval, the film is forced into the reinforcing region of the stress-strain curve at much lower stretch ratios.

---

[1] A draw ratio at which a certain degree of permanent, non-reversible extension, which is just sufficient to change it from its undrawn state to a uniformly drawn and highly oriented state without straining the polymeric material so as to introduce surface cracks or failure, is given to the material.

The rate of longitudinal stretch as calculated herein is based upon stretching uniformly between nips spaced Y inches apart wherein the rate of stretch is determined by averaging the roll speeds ($V_1$) as follows:

EXAMPLE

Speed of slow roll = $V_1$
Speed of fast roll = $X \cdot V_1$
Average speeds of film during stretch $$= \frac{V_1 + X \cdot V^1}{2}$$

Therefore, if the stretch ratio = 3 × (200 percent stretch) then $$\frac{V_1 + 3V_1}{2} = \frac{4V_1}{2} = 2V_1$$

for a film travelling 100 feet/minute = ($2V_1$); the stretch occurring over a space of 8 inches between nips, the rate of stretch is then 30,000 percent per minute, i.e., $$\frac{(200 \text{ percent})(100)}{8/12} = 30{,}000$$

This would represent a minimum value since the stretch probably occurs over a much smaller span than 8 inches, perhaps as small as ½ inch. In this case the rate of stretch might be 480,000 percent per minute. Thus the stretch rates given in the examples to follow are minimum values, since the actual rates of stretch are not known. For example, when film is stretched using nip rolls, the calculated stretch rates are based upon an average film speed and the stretching distance is chosen as the length between the nips. The quoted figures are the minimum values, and the actual values are most likely higher by a factor of 10 or more. To obtain more realistic values of stretch rates, it would be necessary to ink grids on the film, stop the machine during stretching and retrieve and measure the distances between grid lines. This could also be done by high speed photography by constructing a special stretcher.

The invention will be more fully understood by referring to the following examples:

*Example I*

Two samples of substantially amorphous polyethylene terephthalate film were extruded at a temperature of about 280° C. onto a quench drum where they were chilled to a temperature of about 75° C. and then stretched transversely in a tenter frame, the extruder and tenter frame being similar to that described in U.S. Patent 2,823,421. The amount of stretch imparted to the film in the transverse direction (TD) was 3.5 (3.5 times its original width). The film was heated to a temperature of 90–110° C. and stretching was performed at a rate of 3,000 percent per minute.

The films were heated and held at 110° C. for a few seconds on an extension of the tenter frame to increase the crystalline level of the film. The films were then stretched in the longitudinal or machine direction (LD) in a conventional nip roll stretching apparatus. The apparatus used comprised a nip roll web stretcher of two sets of differentially driven pull rolls. The first set of rolls included a radiantly heated top roll covered with silicone rubber and an oil heated coated bottom roll. The second set of rolls included a neoprene-covered top roll and a metal-plated bottom roll. The amount of stretch was controlled by varying the different speeds of the two sets of rolls in amounts to effect the desired longitudinal stretch based on the length of the film prior to longitudinal stretching.

One film sample was heated to 165° C. and stretched 3.5 times its initial length (3.5×) at a rate of 30,000 percent per minute.

The other film sample was heated to 165° C. and stretched 3.0 times at a rate of 100,000 percent per minute.

The films were then heat treated (heat-set) in the nips of a set of driven rolls heated to a temperature of 215° C. while the films were held under tension. The films were cooled and released.

Table I, below, lists the physical properties of polyethylene terephthalate film stretched 3.0 times its initial length in the longitudinal direction at a speed of 100,000 percent per minute compared with the polyethylene terephthalate film stretched 3.5 times its initial length in the longitudinal direction at the conventional rate of stretch. Listed are the transverse direction stretch ratio, transverse direction stretch rates, longitudinal direction stretch ratio, longitudinal direction stretch rate, modulus, tensile strength, thickness, $F_5$, elongation, impact, dimensional stability and $\sigma\hat{u}$ which is a function of crystallite uni-planarity.

TABLE I.—PHYSICAL PROPERTIES OF POLYETHYLENE TEREPHTHALATE FILM STRETCHED IN THE LONGITUDINAL DIRECTION AT 100,000 PERCENT PER MINUTE COMPARED WITH POLYETHYLENE TEREPHTHALATE STRETCHED IN THE LONGITUDINAL DIRECTION AT 30,000 PERCENT PER MINUTE

| Example No. | Control | 1 |
|---|---|---|
| TD Stretch Ratio | 3.5 | 3.5 |
| TD Stretch Rate | 3,000 | 3,000 |
| LD Stretch Ratio | 3.5 | 3.0 |
| LD Stretch Rate | 30,000 | 100,000 |
| $\sigma\hat{u}$ | 12.98 | 10.27 |
| Modulus, p.s.i.: | | |
| LD | 743,500 | 1,024,800 |
| TD | 610,900 | 576,800 |
| Tensile Strength, p.s.i.: | | |
| LD | 27,019 | 40,549 |
| TD | 21,708 | 24,514 |
| Thickness, mils | 1.7 | 0.87 |
| $F_5$, p.s.i.: | | |
| LD | 17,733 | 21,460 |
| TD | 14,372 | 15,002 |
| Elongation, percent: | | |
| LD | 73.6 | 52.9 |
| TD | 13.2 | 124.3 |
| Impact, kg./cm./mil. | 4.83 | 5.04 |
| Dimensional stability percent, 200° C.: | | |
| LD | 8.0 | 5.7 |
| TD | 5.8 | 4.5 |

As can be seen from the table, the film which has been stretched to a lesser extent at the higher stretch rate, has longitudinal direction physical properties such as modulus, tensile strength, $F_5$ and dimensional stability which far exceed those of the conventionally stretched film stretched to a greater extent. In addition, the transverse direction properties of the film prepared by the process of the present invention also show an increase over those of the control film. An insight into this surprising increase in physical property level can be gleamed by a close examination of the degree of crystallite uni-planarity ($\sigma\hat{u}$) of the two films. The $\sigma\hat{u}$ of 10.27° for the film prepared by the present process compared with the $\sigma\hat{u}$ of 12.98° for the control film indicates a very substantial increase in crystalline uni-planarity for the former. This high degree of crystallite uni-planarity is one of the reasons for the striking increase in physical property level.

*Example II*

This example illustrates the preparation of an oriented polyethylene terephthalate film by means of the process of the present invention which possesses enhanced uni-directional physical properties comparable with those of an oriented polyethylene terephthalate film having enhanced uni-directional physical properties prepared by conventional methods utilizing substantially more drastic process conditions.

To serve as a control example, substantially amorphous polyethylene terephthalate film, extruded and quenched as in Example I, was heated to a temperature of 85° C. and stretched in the transverse direction in the tenter frame to an extent of 3.4 times its initial width. The film was held at 110° C. for a few seconds on an extension of the tenter frame to increase the crystalline level of the film. The film was then heated to a temperature of 145° C. and stretched longitudinally between the nips of two sets of differential speed pinch rolls to an extent of 4.5 times its initial length at a stretch rate of 20,000 to 40,000 per cent per minute. The film was then heat treated (heat-set) at a temperature of 185° C. while the film was held under tension.

Another sample of substantially amorphous polyethylene terephthalate film was extruded and quenched as in Example I. This film was heated to a temperature of 90–110° C. and stretched in the transvesrse direction in a tenter frame to an extent of 3.5 times its initial width at a stretch rate of 3,000 percent per minute. The film was held at 110° C. for a few seconds on an extension of the tenter frame to increase the crystalline level of the film. The film was heated to a temperature of 165° C. and stretched longitudinally between the nips of two sets of differential speed rolls to an extent of 3.5 times its initial length at a stretch rate of 100,000 percent per minute. The film was then heat treated (heat-set) at a temperature of 185° C. while the film was held under tension.

The physical properties of the above-described films were measured and are listed in Table II, below.

TABLE II.—PHYSICAL PROPERTIES OF POLYETHYLENE TEREPHTHALATE FILM STRETCHED IN THE LONGITUDINAL DIRECTION AT 100,000 PERCENT PER MINUTE COMPARED WITH POLYETHYLENE TEREPHTHALATE FILM HAVING ENHANCED UNI-DIRECTIONAL PROPERTIES PREPARED IN CONVENTIONAL MANNER

| Example No. | Control | 2 |
| --- | --- | --- |
| TD Stretch Ratio | 3.4 | 3.5 |
| TD Stretch Rate | 900 | 3,000 |
| LD Stretch Ratio | 4.5 | 3.5 |
| LD Stretch Rate | 20,000–40,000 | 100,000 |
| $\sigma\hat{u}$ | 11.7 | 11.3 |
| Modulus, p.s.i.: | | |
| LD | 1,078,000 | 1,036,500 |
| TD | 519,000 | 654,000 |
| Tensile Strength, p.s.i.: | | |
| LD | 42,400 | 33,848 |
| TD | 23,071 | 24,648 |
| Thickness, mils | 1.50 | 0.94 |
| $F_5$, p.s.i.: | | |
| LD | 22,600 | 20,493 |
| TD | 12,700 | 15,454 |
| Elongation, percent: | | |
| LD | 28.7 | 61 |
| TD | 112 | 116 |
| Impact, kg./cm./mil | 3.64 | 4.17 |
| Dimensional stability percent, 200° C.: | | |
| LD | 11.0 | 8.4 |
| TD | 9.4 | 7.8 |

As can be readily ascertained by examination of Table II, the film prepared by the process of the present invention normally possesses a level of longitudinal direction physical properties which closely approaches those of a film having enhanced physical properties prepared by conventional methods, but also possesses a level of transverse direction tensile properties (modulus, tensile strength, $F_5$) which are superior to those of a substantially balanced polyethylene terephthalate film. The $\sigma\hat{u}$ value of 11.33 signifies that this film has a high degree of crystallite uni-planarity. Thus it is evident that these films are not only useful for such specific end uses requiring enhanced uni-directional physical properties as magnetic tapes and the like, but also may be employed as an all-purpose film in a multitude of end uses for which bi-directionally oriented polyethylene terephthalate film is now utilized.

The process of the present invention provides a surprisingly simple, efficient, economical method for preparing oriented polyethylene terephthalate films which not only possess surprisingly high physical property levels in both directions, making them ideally suited for a great variety of end uses in the packaging, electrical, fabric- and glass-replacement fields, but also quite unexpectedly are characterized by having unusually high physical property levels in the longitudinal direction, making them prime base film candidates for the tape (video, sound recording, adhesive, strapping, etc.) products wherein high levels of longitudinal direction physical property is such as $F_5$, tensile strength and tensile modulus are prerequisites.

The films prepared by this process possess a high level of crystallite uni-planarity, characteristic of high physical property level films.

The most surprising features of this process are the phenomenal orientation efficiency achieved and the ability to produce film structures not now possible at the rates of stretching speed now employed commercially. In carrying out this process, longitudinal direction stretch ratios far below those required for conventional processes are utilized for producing oriented polyethylene terephthalate films of similar physical property level. Even more surprising and in total opposition to the accepted existing theory of molecular orientation of thermoplastic films, is the fact that an oriented polyethylene terephthalate film having enhanced property levels in one direction may be achieved by stretching to a lesser extent in that direction.

Additionally, as evidenced by the low $\sigma\hat{u}$ values (high uni-planarity) obtainable by this process, unique structures yielding different levels and combinations of physical properties are now made available.

The process of this invention will also find great utility in the processing of heavy gauge polyethylene terephthalate films, the production of which has not been practical previously because of the difficulty in utilizing conventional equipment in stretching the film to the extents necessary to satisfactorily molecularly orient the film.

What is claimed is:

1. The process comprising stretching a substantially amorphous polymeric linear terephthalate ester film at a temperature at which molecular orientation is effected in the direction perpendicular to extrusion to an extent of at least 2.5 times its initial width at a rate of speed of at least 1,000 percent per minute; and thereafter, stretching said film at a temperature at which molecular orientation is effected in the direction in which the film is extruded to an extent of at least 2.5 times its length at a rate of speed of at least 60,000 percent per minute.

2. The process comprising heating substantially amorphous polyethylene terephthalate film to a temperature within the range of 80–90° C., stretching said film after attaining said temperature in the direction perpendicular to that in which the film was extruded to an extent of 2.5–4 times its initial width at a rate of speed of at least 1,500 percent per minute, heating the once stretched film to a temperature within the range of 90–160° C. and stretching said film after attaining said temperature in the direction in which the film was extruded to an extent of 2.5–5 times its initial length at a rate of speed of at least 60,000 percent per minute.

3. A process for preparing an oriented polyethylene terephthalate film having enhanced physical properties in the direction in which the film was extruded comprising heating said film to a temperature within the range of 80–90° C., stretching said film after attaining said temperature in the direction perpendicular to that in which the film was extruded to an extent of 3.5–5 times its initial width at a rate of speed of at least 3,000 percent per minute, heating the once stretched film to a temperature within the range of 90–160° C. and stretching said film after attaining said temperature in the direction in which the film was extruded to an extent of 3–3.5 times its initial length at a rate of speed of at least 100,000 percent per minute.

4. The process of claim 3 wherein the two-way stretched film is heat set at a temperature within the range of 135–250° C.

5. A process for preparing an oriented polyethylene terephthalate film having enhanced physical properties comprising continuously casting a substantially amorphous polyethylene terephthalate film, continuously stretching said amorphous film at a rate of speed of at least 3,000 percent per minute in the transverse direction to an extent of 3.5 to 4 times its initial width at a temperature within the range of 80–90° C., continuously stretching said film at a rate of speed of at least 100,000 percent per minute in the longitudinal direction to an extent of 3–3.5 times its initial length at a temperature within the range of 90–160° C., and continuously heat-setting said two-way stretched film at a temperature within the range of 135–250° C.

References Cited by the Examiner

UNITED STATES PATENTS

| | | | |
|---|---|---|---|
| 2,904,841 | 9/1959 | Haugh | 254—289 |
| 2,995,779 | 8/1961 | Winter | 18—48 |

ALEXANDER H. BRODMERKEL, *Primary Examiner.*

MICHAEL V. BRINDISI, *Examiner.*

A. L. LEAVITT, *Assistant Examiner.*